N. B. DIXON.
PLANT PROTECTOR.
APPLICATION FILED DEC. 5, 1910.
989,341.
Patented Apr. 11, 1911.
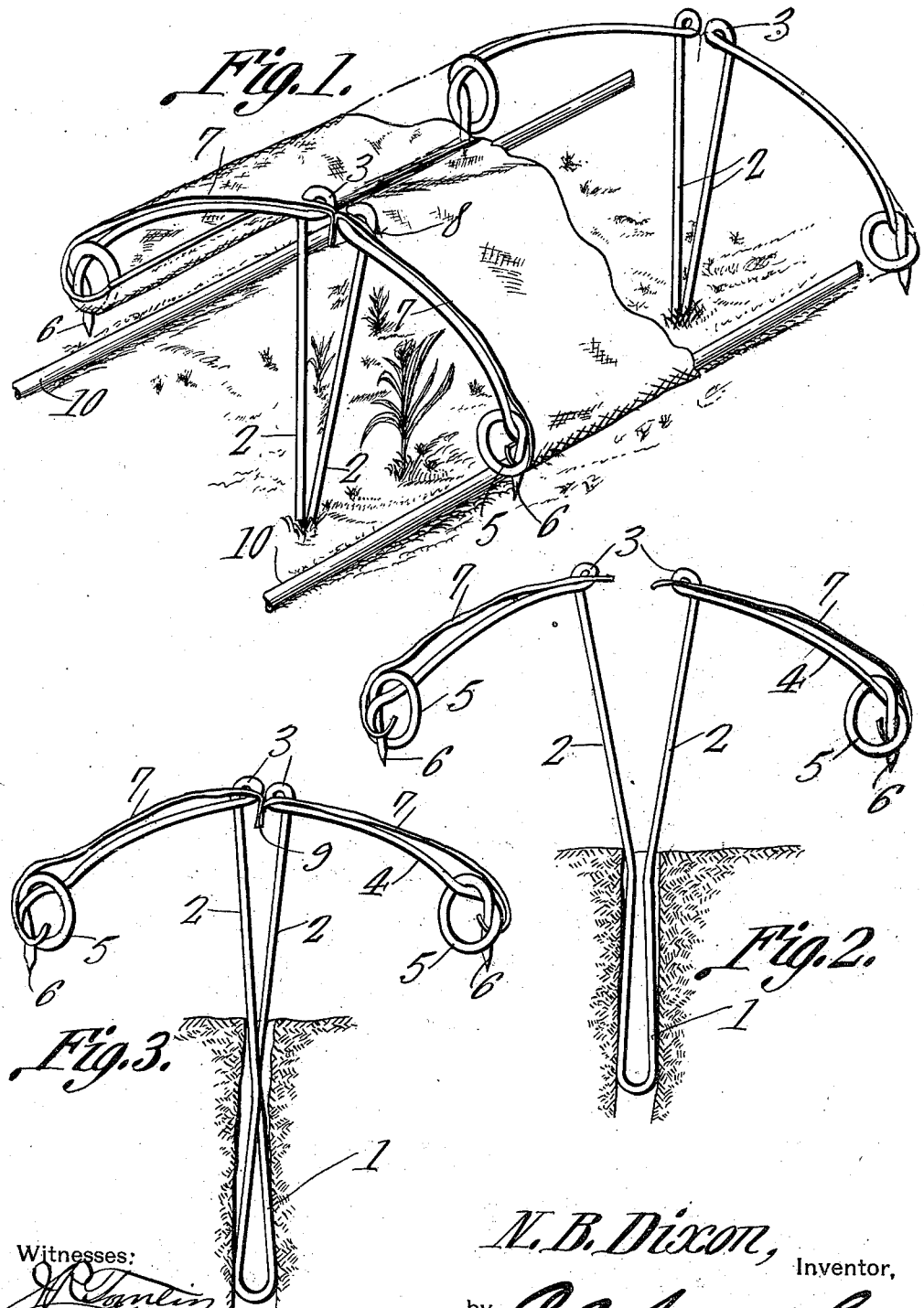

UNITED STATES PATENT OFFICE.

NAPOLEON B. DIXON, OF ANDALUSIA, ALABAMA.

PLANT-PROTECTOR.

989,341. Specification of Letters Patent. Patented Apr. 11, 1911.

Application filed December 5, 1910. Serial No. 595,747.

*To all whom it may concern:*

Be it known that I, NAPOLEON B. DIXON, a citizen of the United States, residing at Andalusia, in the county of Covington and State of Alabama, have invented a new and useful Plant-Protector, of which the following is a specification.

This invention relates to plant protectors.

The object of the invention is in a ready, practical and inexpensive manner, to protect tender growing plants from the injurious effects of extreme heat or cold; to provide proper ventilation and the exposure of the plants to sun and light; and in the event of a fall of temperature that would prove fatal to the plants, to supply artificial heat in such manner as to insure their preservation.

With the above and other objects in view, as will appear as the nature of the invention is better understood, the same consists in the novel construction and combination of parts of a plant protector, as will be hereinafter fully described and claimed.

In the accompanying drawing forming a part of this specification, and in which like characters of reference indicate corresponding parts:—Figure 1 is a view in perspective, with the parts broken away, displaying the manner of disposing the protector relatively to the plants. Fig. 2 is a view in elevation displaying the protector as it appears when open for the purpose of admitting light and water to the plants. Fig. 3 is a view similar to Fig. 2, showing the protector as it appears when in position to shield the plants from heat or cold.

The protector embodies a shield or cover, and any number of resilient standards to which the cover is attached, two of which are shown in the present instance, and as each is a counterpart of the other, a description of one will serve for both.

The standard is constructed from a length of resilient galvanized wire bent upon itself to form an elongated loop 1 designed to be sunk into the ground, thence bent outward to form two divergent arms 2 thence bent in opposite directions to form two loops 3, and thence bent to form two outward extending downwardly curved arms 4 the terminals of which are formed in coils 5, the ends of the coils being projected therethrough and formed into pointed prongs 6. These prongs provide means for attaching to the standards of one edge portion of the shield or cover 7, which may be of any suitable textile material, preferably one that is water-proof, the other edge portion being provided with slits or openings 8 that receive the loops 3 and thus retain the cover in place. As will be observed by reference to the drawing, the coils constitute stops to prevent the cover from working upward upon the arms 4, the same function being secured by the loops 3.

When it is desired to protect the plants, the standards are thrust down into the ground, and as the two divergent arms contact with the earth, they are closed so as to bring the two edges 9 of the cover in contact, as clearly shown in Fig. 3. Should it be desired to ventilate the plants, or allow the sun to strike them, the standards are partly withdrawn, as shown in Fig. 2, whereupon the parts will assume the position shown in that figure.

As stated, any means desired may be employed for subjecting the plants to the action of artificial heat, and may be secured in any preferred manner, that shown consisting of steam pipes 10 which connect with a suitable source of steam, not necessary to be shown.

It will be seen from the foregoing description that while the protector herein defined is simple in character, it will be thoroughly efficient for the purposes designed, and will result in the saving of the lives of tender plants that would otherwise be sacrificed on account of extreme heat or cold.

I claim:—

1. A plant protector embodying a plurality of standards each consisting of a ground-engaging member bearing divergent arms terminating in loops and laterally extending members terminating in coils and prongs, and a cover secured in position by the loops and prongs.

2. A plant protector comprising a plurality of standards, each of which consists of a length of wire bent upon itself to form an elongated loop that constitutes a ground-engaging member, the wire being deflected outwardly in opposite directions to provide two resilient arms, then bent to form two loops and two laterally projecting arms that terminate in coils whereof the terminals constitute prongs, and a cover held in position by the loops and prongs.

In testimony that I claim the foregoing as my own, I have hereto affixed my signature in the presence of two witnesses.

NAPOLEON B. DIXON.

Witnesses:
    Mrs. G. C. SMITH,
    JOHN E. STANLEY.

Copies of this patent may be obtained for five cents each, by addressing the "Commissioner of Patents, Washington, D. C."